L. RENAULT.
MEANS FOR LUBRICATING INTERNAL COMBUSTION ENGINES.
APPLICATION FILED APR. 9, 1910.
1,055,558.
Patented Mar. 11, 1913.
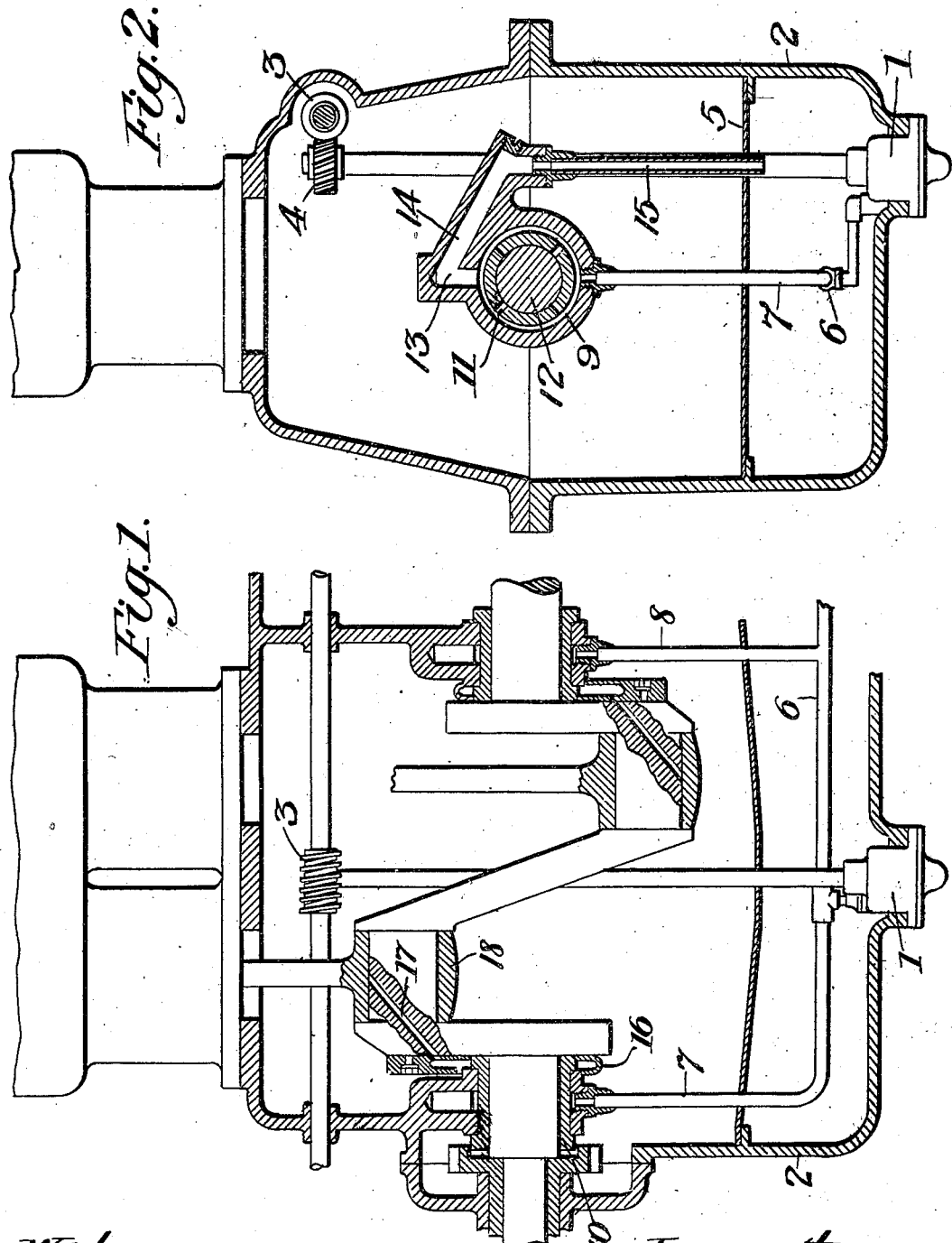

UNITED STATES PATENT OFFICE.

LOUIS RENAULT, OF BILLANCOURT, FRANCE

MEANS FOR LUBRICATING INTERNAL-COMBUSTION ENGINES.

1,055,558. Specification of Letters Patent. Patented Mar. 11, 1913.

Application filed April 9, 1910. Serial No. 554,549.

*To all whom it may concern:*

Be it known that I, LOUIS RENAULT, citizen of the French Republic, residing at Billancourt, Department of the Seine, in France, have invented certain new and useful Improvements in Means for Lubricating Internal-Combustion Engines; and I do hereby declare the following to be a full, clear, and exact description of the invention, such as will enable others skilled in the art to which it appertains to make and use the same.

The means heretofore employed in certain motors for lubrication under pressure present various defects. In particular, the quantity of oil that escapes from the bearings as a result of the play arising in them in consequence of wear increases with this wear. This loss of oil likewise varies with the fluidity of the oil. Then again, in all motors lubricated under pressure it is found that the pressure is very considerable on starting and then diminishes. This diminution of pressure corresponds to an increase of oil escaping between the shaft and the bearing. The result is a projection of oil along the walls of the cylinder or cylinders of the motor. Furthermore, the excess oil is burned in the explosion chambers and consequently wasted, the result being a useless consumption of oil and the production of objectionable smoke.

Explosion motors, contrary to what is generally the case with steam engines, are generally single acting. Consequently the direction of the motor effort is not changed and in these conditions it is not as important as in a steam engine that the oil should be kept at a certain pressure between the connecting rod and the crank journal.

In the device which forms the object of the present invention, the purpose in view has been to insure the circulation of the oil continuously around moving parts of the motor in such a manner that the oil that enters the bearings as a result of the wear that they experience in use, does not increase in accordance with the fluidity of the oil or with the amount of wear.

The principle of the invention consists in causing the oil to enter beneath the bearing and in insuring the lubrication of the shaft over its entire circumference by only allowing the oil to issue at the upper part of the bearing, the outlet being appreciably larger in cross section than the inlet so that no resistance is opposed to the egress of the oil. The return pipe is fitted to the outlet slightly above the bearing so as to maintain constant the pressure represented by this small column of liquid.

An embodiment of the invention is illustrated by way of example in the accompanying drawing.

Figure 1 is a vertical axial section of a portion of an explosion motor. Fig. 2 is a cross section of the same.

A pump 1 arranged at the lower part of the crank case 2 and driven automatically by the motor (for example by means of an endless screw 3 mounted upon the distributing shaft and actuating a pinion 4 mounted upon the pump shaft) takes the oil from the lower part of the crank case, after it has been filtered through a sieve 5, and forces it through a distributing pipe 6 and a series of passages 7—8, etc., to each of the bearings of the motor. Each of these passages 7 opens at the lower part of the bearing that it supplies; thence the oil spreads in an annular passage 9 surrounding the bearing 10 which it traverses through a certain number of orifices 11. In this manner it reaches the driving shaft 12. The oil in excess escapes through the orifice 13 formed at the upper part of the bearing, the diameter of this orifice being appreciably larger than that of the pipe 7; it flows freely through a conduit 14 and through a pipe 15 which is likewise much larger in cross section than the pipe 7, and then returns to the crank case. The oil that escapes at the end of the bearings is projected by centrifugal force into the grooves 16 in the collars fixed to the crank shaft and it provides for the lubrication of the connecting rod heads 18 by means of passages such as 17.

I claim:

1. The combination with a shaft journal, of a bearing surrounding the same, said bearing provided with radial ducts adapted to conduct lubricant to the journal of the shaft, an annular space surrounding said bearing, an oil supply pipe leading to said annular space, a return pipe of larger diameter than said supply pipe to conduct the oil from said annular space, said return pipe having a vertical portion adjacent the bearing to retain a column of oil that is fed to the shaft journal, and means to circulate the oil through said pipes.

2. The combination with a shaft journal, of a bearing surrounding the same, said bearing provided with radial ducts adapted to conduct lubricant to the journal of the shaft, an annular space surrounding said bearing, an annular chamber adjacent said annular space and adapted to catch the leakage of oil therefrom for further lubrication of the parts, an oil supply pipe leading to said annular space, a return pipe of larger diameter than said supply pipe to conduct the oil from said annular space, said return pipe having a vertical portion adjacent the bearing to retain a column of oil that is fed to the shaft journal, and means to circulate the oil through said pipes.

3. The combination with a shaft journal, of a bearing surrounding the same, said bearing provided with radial ducts adapted to conduct lubricant to the journal of the shaft, an annular space surrounding said bearing, an oil supply pipe leading to said annular space, a return pipe of larger diameter than said supply pipe to conduct the oil from said annular space, said return pipe having means to retain a column of oil that is fed to the shaft journal, and means to circulate the oil through said pipes.

In testimony whereof I affix my signature, in presence of two witnesses.

LOUIS RENAULT.

Witnesses:
H. C. COXE,
EMILE KLOK.

---

Copies of this patent may be obtained for five cents each, by addressing the "Commissioner of Patents, Washington, D. C."